United States Patent [19]

Skarda et al.

[11] Patent Number: 5,463,261
[45] Date of Patent: Oct. 31, 1995

[54] POWER CONSERVATION DEVICE FOR A PERIPHERAL INTERFACE MODULE

[75] Inventors: Louis J. Skarda, Lake Elmo; Stanley H. Miller, Stillwater; Timothy L. McCullough, Mahtomedi, all of Minn.

[73] Assignee: Minnesota Mining and Manufacturing Company, St. Paul, Minn.

[21] Appl. No.: 325,578

[22] Filed: Oct. 19, 1994

[51] Int. Cl.$^6$ ...................................................... H02H 5/00
[52] U.S. Cl. .................. 307/131; 439/55; 439/56; 395/442; 395/283; 361/737; 361/740
[58] Field of Search .............................. 307/131; 439/55, 439/59–70; 395/75, 425, 800, 275; 364/200

[56] References Cited

U.S. PATENT DOCUMENTS

| | | | |
|---|---|---|---|
| 4,577,315 | 3/1986 | Otsuka | 370/95 |
| 4,667,289 | 5/1987 | Yoshida et al. | 364/200 |
| 4,802,204 | 1/1989 | Chang | 379/100 |
| 4,841,440 | 6/1989 | Yonezu et al. | 395/275 |
| 4,980,885 | 12/1990 | Servel et al. | 370/60 |
| 5,153,832 | 10/1992 | Anderson et al. | 364/422 |
| 5,163,124 | 11/1992 | Yabe et al. | 395/750 |
| 5,167,024 | 11/1992 | Smith et al. | 395/375 |
| 5,183,404 | 2/1993 | Aldous et al. | 439/55 |
| 5,191,323 | 3/1993 | Abbes et al. | 340/825.37 |
| 5,237,692 | 8/1993 | Raasch et al. | 395/725 |
| 5,388,265 | 2/1995 | Volk | 395/750 |

FOREIGN PATENT DOCUMENTS

2110441B  6/1983  United Kingdom ............ G06F 11/30

*Primary Examiner*—William M. Shoop, Jr.
*Assistant Examiner*—Albert Paladini
*Attorney, Agent, or Firm*—Gary L. Griswold; Walter N. Kirn; Steven J. Shumaker

[57] ABSTRACT

A power conservation device for a peripheral interface module configured for use in an electronic device includes a sensing means that senses whether the module is in use, and a switching means that connects power from the electronic device to the module when the module is in use, and disconnects power from the electronic device to the module when the module is not in use. The peripheral interface module is designed for use with a peripheral device that is coupled to the module via a peripheral device plug. The peripheral device plug engages a socket provided in the module. The sensing means senses whether the plug engages the socket as an indication of whether the module is actually in use. In response, the switching means disconnects power from the electronic device to the module when the plug does not engage the socket, and connects power from the electronic device to the module when the plug does engage the socket. The power conservation device generally limits power consumption to periods in which the module is in use, thereby improving power efficiency and conserving battery resources in the electronic device.

40 Claims, 5 Drawing Sheets

POWER CONSERVATION DEVICE FOR A PERIPHERAL INTERFACE MODULE

FIELD OF THE INVENTION

The present invention relates to electronic hardware, and, more particularly, to peripheral interface modules used in electronic devices such as computers.

DISCUSSION OF RELATED ART

Continued reductions in the size of electronic devices, such as computers, have required similar reductions in the size of associated hardware components. The size reductions have prompted the establishment of dimensional standards, or "form factors," governing the width, length, and thickness of various hardware components. Many peripheral interface modules, for example, presently are manufactured as cardlike packages that conform to "form factors" established by the Personal Computer Memory Card International Association (PCMCIA). The PCMCIA form factors have varying thicknesses, but share common surface areas that approximate the shape and surface area of a credit card. The peripheral interface cards can be plugged into an electronic device, such as a computer, in a modular fashion to provide a variety of functions.

Manufacturers have applied the PCMCIA form factors to produce various credit-card sized interface cards, including Local Area Network (LAN) cards, fax/modem cards, Small Computer Systems Interface (SCSI) cards, and Global Positioning System (GPS) cards. The interface cards typically include external connector hardware configured to connect the card to a peripheral device outside of the electronic device in which the card is housed. A LAN card, for example, includes connector hardware that connects the card to a LAN, or to a LAN transceiver in the case of a wireless LAN. Similarly, a fax/modem card includes connector hardware configured for connection to the public telephone lines, either directly or by cellular telephone. A SCSI card includes connector hardware designed to connect the card to a wide variety of peripheral devices, such as external hard-disk drives, CD-ROM drives, or tape drives. Finally, a GPS card includes connector hardware suitable for connection to a satellite antenna. For many interface cards, the connector hardware comprises a peripheral device plug that plugs into an edge connector mounted within the card. For other cards, the connector hardware may comprise a spring-loaded peripheral device socket that is both extendable from the card housing to receive a plug, and retractable when the card is not in use.

The peripheral interface module, in it present card-like form, fits within a PCMCIA slot provided in an electronic device, such as a computer. The PCMCIA slot includes a multi-contact connector that mates with another multi-contact connector mounted on an edge of the card. Both connectors include various control and status contacts, as well as power supply contacts that provide the peripheral interface card with power $V_{cc}$ from a power supply associated with the electronic device. Upon being loaded into the PCMCIA slot, the card begins to draw power from the power supply of the electronic device, and continues to draw power until the card is removed. Thus, the interface card consumes power even during periods of nonuse. Power efficiency remains a significant concern in the design of electronic devices. The issue of power efficiency is particularly important in the design of small, portable electronic devices. Portable electronic devices such as laptop computers, notebook computers, handheld computers, and personal digital assistants (PDA's), for example, have limited battery resources, and therefore must avoid undue power consumption. Peripheral interface cards present a continuous and, often times, unnecessary drain on power, however, and therefore frustrate efforts to achieve power efficiency. Measures to reduce power consumption by peripheral interface cards have previously focused on the use of software routines, executed by a microprocessor carried by the card, that adjust power consumption in a modal manner. Such software routines typically include, for example, an "operating" mode, in which the peripheral interface card operates at a maximum power level, a "standby" mode, activated in response to the elapse of a period of nonuse, in which the card operates at an intermediate power level, and a "sleep" mode, activated in response to a longer period of nonuse, in which the card operates at a minimum power level. Unfortunately, it has not been possible to provide a "dead" mode, in which the card consumes no power, because the microprocessor itself requires power to execute the software routines.

One example of a commercially available PCMCIA card providing modal power adjustment is the 14.4 kHz ST 1414 internal fax/modem card, manufactured by Smart Modular Technologies, of Fremont, Calif. According to published performance specifications, the ST 1414 card exhibits a sleep-mode power consumption level of approximately 10 mW, relative to operating and standby mode levels of 750 mW and 350 mW, respectively. Although the sleep-mode power consumption of the ST 1414 is considered to be very low, the card continues to consume at least a minimum level of power whenever the card is loaded into an electronic device. The level of power consumed by the card is not insignificant, particularly in smaller, light-weight portable computers requiring reduced battery size with equivalent computing power. Moreover, power consumption likely will be an even bigger concern when 28.8 kHz fax/modem cards conforming to the new V.34 protocol appear on the market. Early industry reports indicate that the increased transfer speed of the 28.8 kHz fax/modem cards will result in increased power consumption, relative to existing 14.4 kHz cards. Accordingly, there is a need for an improved peripheral interface module that achieves even further reductions in power consumption.

SUMMARY OF THE INVENTION

In view of the power consumption problems associated with existing peripheral interface modules configured for use in electronic devices, the present invention is directed to a power conservation device for such a module. The power conservation device of the present invention disconnects power from the electronic device to the peripheral interface module when the module is not actually in use, e.g., not disposed for communication with a peripheral device. The power conservation device thereby increases the power efficiency of the peripheral interface module to conserve power in the electronic device.

Additional features and advantages of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings.

To achieve the foregoing advantages, as broadly embodied and described herein, the present invention provides a power conservation device for a peripheral interface module configured for use in an electronic device, the module having a housing, peripheral interface hardware mounted within the housing, a socket, mounted within the housing and electrically coupled to the peripheral interface hardware, for being engaged by a peripheral device plug and electrically coupling the peripheral device plug to the peripheral interface hardware, and a module power terminal for receiving power from an electronic device power terminal associated with the electronic device when the module is coupled to the electronic device, and for providing the power to the peripheral interface hardware, the power conservation device comprising sensing means for sensing whether the peripheral device plug engages the socket, and switching means, responsive to the sensing means, for disconnecting the module power terminal from the electronic device power terminal when the peripheral device plug does not engage the socket, and connecting the module power terminal to the electronic device power terminal when the peripheral device plug engages the socket.

The present invention also provides a peripheral interface module configured for use in an electronic device, the module comprising a housing, peripheral interface hardware mounted within the housing, a socket, mounted within the housing and electrically coupled to the peripheral interface hardware, for being engaged by a peripheral device plug and electrically coupling the peripheral device plug to the peripheral interface hardware, a module power terminal for receiving power from an electronic device power terminal associated with the electronic device when the module is coupled to the electronic device, and for providing the power to the peripheral interface hardware, sensing means for sensing whether the peripheral device plug engages the socket, and switching means, responsive to the sensing means, for disconnecting the module power terminal from the electronic device power terminal when the peripheral device plug does not engage the socket, and connecting the module power terminal to the electronic device power terminal when the peripheral device plug engages the socket.

It is to be understood that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

Reference will now be made in detail to exemplary embodiments of the invention. One skilled in the art, given the description herein, will recognize the utility of the power conservation device of the present invention with a variety of diverse peripheral interface modules configured for use in electronic devices, such as computers. For example, the power conservation device of the present invention may be readily applied to LAN, fax/modem, SCSI, and GPS modules. In addition, the power conservation device may be applied to peripheral interface modules conforming to existing PCMCIA form factors, and conceivably to modules conforming to new form factors to be established in the future. However, for ease of description, as well as for purposes of illustration, the power conservation device of the present invention generally will be described herein in the context of application to peripheral interface modules in the form of PCMCIA peripheral interface cards.

Figure 1:
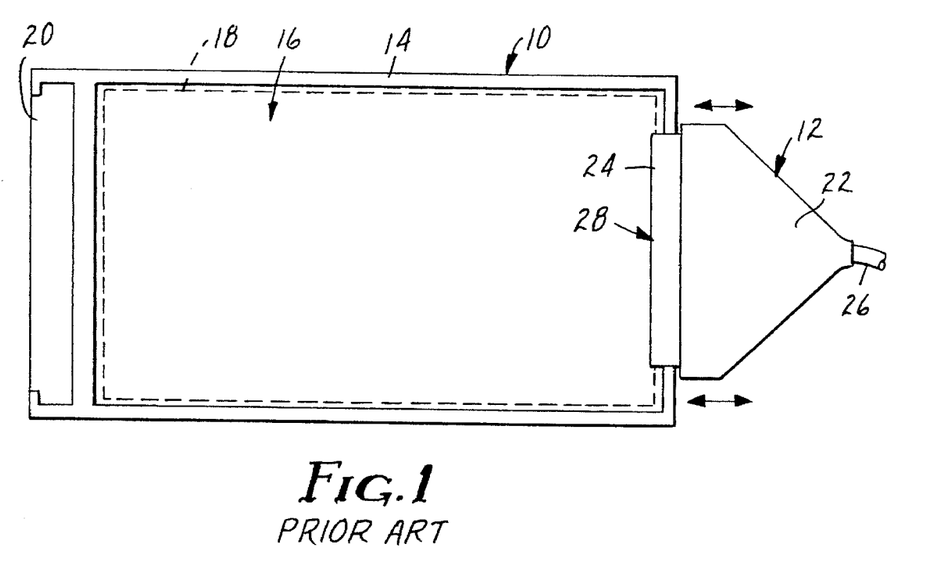
FIG. 1 is a schematic diagram of a conventional peripheral interface card having a first type of peripheral device plug.

FIG. 1 is a schematic diagram of a conventional peripheral interface card 10 having a first type of peripheral device plug 12. An example of a commercially available PCMCIA peripheral interface card conforming substantially to card 10 is the abovementioned ST 1414 internal fax/modem card, manufactured by Smart Modular Technologies, of Fremont, Calif. The card 10 comprises a housing 14 having a surface area approximately the size of a credit card. An area 16, outlined by dotted line 18, defines a space within housing 14 for mounting a circuit board (not shown) carrying peripheral interface hardware. The card 10 is designed to fit within a PCMCIA slot of an electronic device, such as a computer, and includes an electronic device socket 20 within housing 14 that defines a space for mounting a multi-contact connector (not shown). The multi-contact connector is configured to mate with another multi-contact connector mounted in the PCMCIA slot of the electronic device The mating connectors serve to electrically connect the electronic device to the peripheral interface hardware carried by card 10 and to provide power to the card. The multi-contact connector of card 10 includes, in particular, a power source contact that mates with a power source contact carried by the multi-contact connector in the PCMCIA slot. The power source contacts serve as an electronic device power terminal $V_{cc}$, receiving power from a power source associated with the electronic device. Conductive traces on the circuit board carried by card 10 electrically connect the electronic device power terminal $V_{cc}$ to a card power terminal $V_{card}$ associated with the peripheral interface hardware. When card 10 is loaded into the PCMCIA slot of the electronic device, the card power terminal $V_{card}$ receives power from the electronic device power terminal $V_{cc}$ and provides the power to the peripheral interface hardware, thereby powering card 10 for operation.

The peripheral device plug 12 of card 10 is configured to connect the peripheral interface hardware to a peripheral device external to the electronic device. The peripheral device plug 12 includes a plug housing 22, a plug connector 24, and a cable 26. The connector housing 22 contains a wiring harness that couples plug connector 24 and cable 26. The plug connector 24 mates with another connector (not shown) that is mounted within a peripheral socket 28 of housing 14 and coupled to the peripheral interface hardware of card 10. The cable 26 couples plug connector 24 to a peripheral device. If card 10 is configured as a fax/modem card, for example, cable 26 may be coupled to an RJ-11 connector for communication with a telephone line. Thus, the peripheral device plug 12 functions to connect the peripheral interface hardware to the peripheral device, and therefore must be plugged into card 10 to enable operation.

Figure 2:
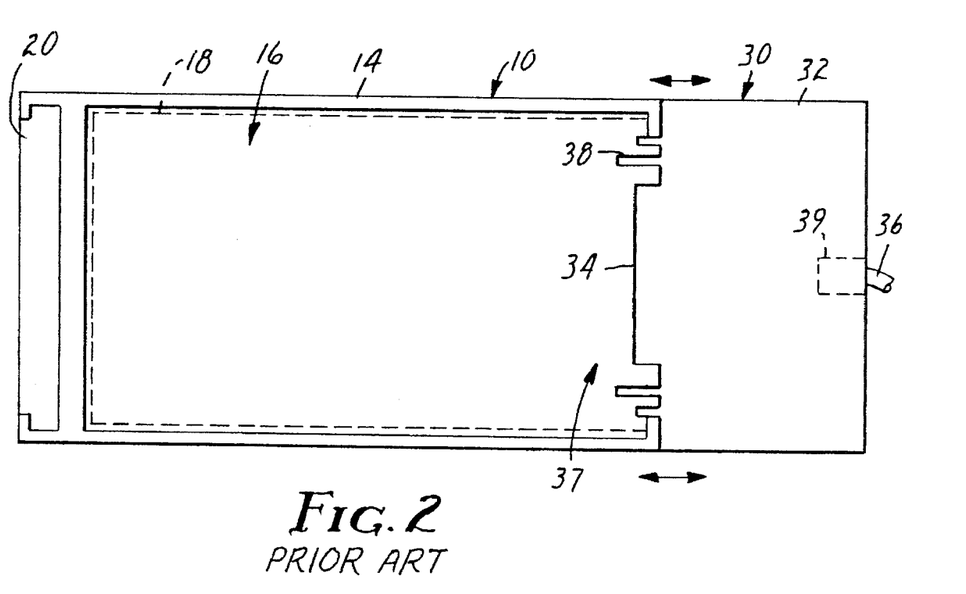
FIG. 2 is a schematic diagram of a conventional peripheral interface card having a second type of peripheral device plug.

FIG. 2 is a schematic diagram of a conventional peripheral interface card 10 configured as in FIG. 1, but having a second type of peripheral device plug 30. An example of a commercially available PCMCIA peripheral interface card having a peripheral device plug substantially conforming to plug 30 of FIG. 2 is the WORLDPORT™ internal fax/modem card, manufactured by US Robotics, of Skokie, Ill. The peripheral device plug 30 includes a plug housing 32, a plug connector 34, and a cable 36. The plug housing 32 contains both a wiring harness that couples plug connector 34 and cable 36, and a data access arrangement (DAA) that converts data received via the cable prior to introduction to the peripheral interface hardware carded by card 10. The plug connector 34 mates with another connector (not shown) that is mounted within a peripheral socket 37 of housing 14 and coupled to the peripheral interface hardware carded by the card. The plug housing 32 includes guide pins 38 for guiding plug connector 34 into guide holes provided in peripheral socket 37. The cable 36 may include an RJ-11 connector 39, as shown in FIG. 2, that plugs directly into a socket in plug housing 32 for fax/modem applications. As with peripheral device plug 12 of FIG. 1, peripheral device plug 30 must be plugged into card 10 for operation.

Figure 3:
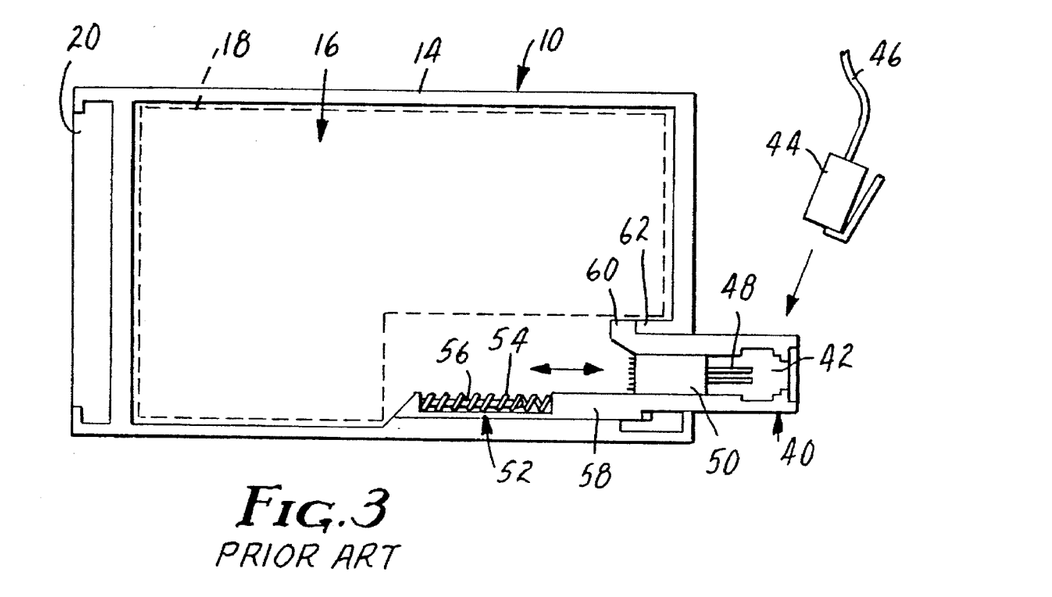
FIG. 3 is a schematic diagram of a conventional peripheral interface card having an extendable/retractable peripheral device socket.

FIG. 3 is a schematic diagram of a conventional PCMCIA peripheral interface card 10 configured as in FIG. 1, but having an extendable/retractable peripheral device socket 40. An example of a PCMCIA peripheral interface card having a peripheral device socket substantially conforming to socket 40 is disclosed in U.S. Pat. No. 5,183,404. An example of a commercially available PCMCIA peripheral interface card having a peripheral device socket substantially conforming to socket 40 is the internal fax/modem card manufactured by Megahertz Corporation, of Salt Lake City, Utah, under the registered trademark XJack®. As shown in FIG. 3, the peripheral device socket 40 is mounted within card housing 14, and includes an aperture 42 that receives an external RJ-11 connector 44 having a cable 46 when the socket is extended from the housing. The RJ-11 connector 44 functions as the peripheral device plug for the extendable/retractable socket 40. Thus, socket 40 must be extended from housing 14 to enable operation of card 10 in conjunction with a peripheral device.

A set of wire leads 48, molded into a plastic block 50, are electrically coupled to contacts on RJ-11 connector 44 when the RJ-11 connector is received within aperture 42. The contacts on RJ-11 connector 44 couple wire leads 48 to cable 46, which may be coupled for communication with a telephone line. A small, flexible cable (not shown) electrically couples wire leads 48, and thus RJ-11 connector 44, to the peripheral interface hardware mounted in area 16. A spring-loaded mechanism 52, mounted within housing 14, provides means for extending socket 40 from the housing to receive connector 44, and for retracting the socket into the housing when card 10 is not in use. The spring-loaded mechanism 52 includes a spring 54 wound about a guide post 56. The spring 54 and guide post 56 are positioned such that when socket 40 is forced into housing 14 by manual force, the spring is compressed by a first flange 58 forming part of the socket. When the inward force is removed, spring 54 is free to expand against first flange 58, thereby forcing socket 40 out of housing 14.

The first flange 58 includes a ratcheted groove (not shown) associated with an actuating shaft mounted within housing 14, as is described in detail in U.S. patent application Ser. No. 5,183,404. The ratcheted groove functions to lock the position of socket 40 within housing 14 when the socket is forced a sufficient distance inward. The ratcheted groove thereby maintains spring 54 in its compressed state to hold socket 40 in a retracted position relative to housing 14. When the socket is again pushed inward, the ratcheted groove momentarily unlocks the position of socket 40 and allows spring 54 to expand, thereby extending the socket from housing 14. In FIG. 3, socket 40 is shown in its extended position relative to housing 12. The ratcheted groove has a finite longitudinal distance that limits the distance of travel of socket 40 due to abutment of the actuating shaft with the end of the groove. In addition, socket 40 includes a second flange 60 that glides along a bottom surface of housing 14 until it abuts with a retainer wall 62, also limiting travel of the socket outward from the housing.

The cards 10 shown in FIGS. 1–3 each require connection to a peripheral device for operation. For example, the cards 10 shown in FIGS. 1 and 2 include peripheral device plugs 12, 30 that must be plugged into peripheral sockets 28, 37 for connection to peripheral devices. Similarly, the card 10 shown in FIG. 3 includes extendable/retractable peripheral device socket 40, which must be connected to a peripheral device for operation. Each of the cards 10 consumes power immediately upon being coupled to the PCMCIA slot of an electronic device. Although software routines implemented by the peripheral interface hardware may adjust power consumption in a modal manner, the cards 10 continue to draw at least some power whenever loaded in the PCMCIA slot. Consequently, the cards 10 consume power without regard to whether the peripheral interface hardware is actually in use.

Power consumption during periods of nonuse constitutes waste and inefficiency, particularly in portable electronic devices having limited battery resources. Therefore, in accordance with the present invention, there is provided a power conservation device for a peripheral interface card that generally eliminates power consumption during periods of nonuse, thereby improving power efficiency. The power conservation device of the present invention comprises both sensing means and switching means. The sensing means senses whether the peripheral interface card is in use. The switching means acts, in response to the sensing means, to disconnect the card power terminal $V_{card}$ from the electronic device power terminal $V_{cc}$ when the card is not in use, and to connect the card power terminal $V_{card}$ to the electronic device power terminal $V_{cc}$ when the card is in use.

Figure 4:
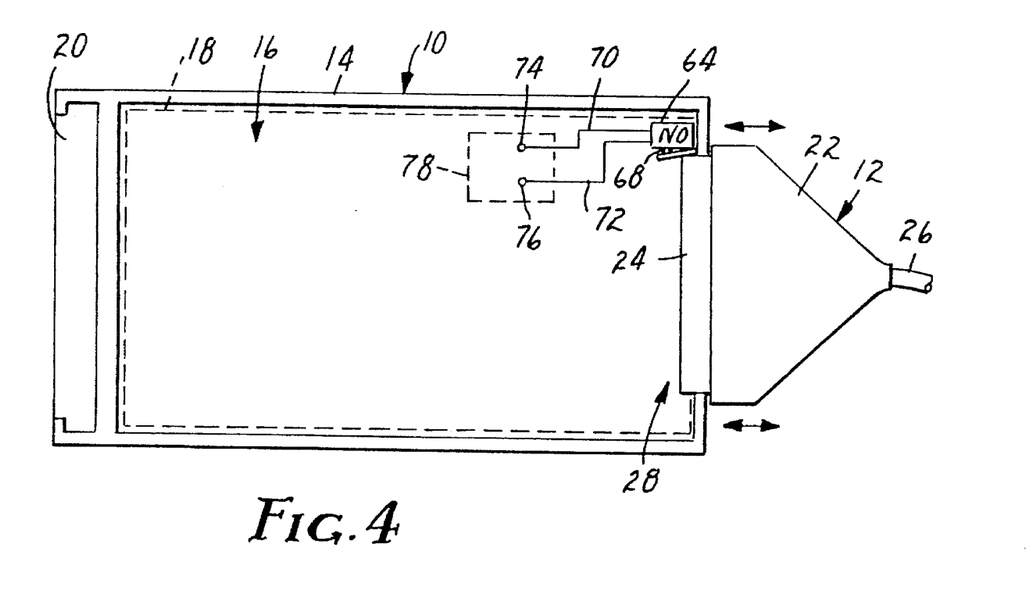
FIG. 4 is a schematic diagram of a peripheral interface card having the first type of peripheral device plug shown in FIG. 1, and incorporating a first embodiment of a power conservation device, in accordance with the present invention.

FIG. 4 is a schematic diagram of a peripheral interface card 10 having the first type of peripheral device plug 12 illustrated in FIG. 1, but incorporating a first embodiment of a power conservation device, in accordance with the present invention. In this first embodiment, the sensing means includes means for sensing whether peripheral device plug 12 engages peripheral socket 28 as an indication of whether card 10 is in use. In other words, the sensing means determines whether peripheral device plug 12 is actually plugged into card 10. The switching means includes means, responsive to the sensing means, for disconnecting card power terminal $V_{card}$ from electronic device power terminal $V_{cc}$ when peripheral device plug 12 does not engage peripheral socket 28, and connecting card power terminal $V_{card}$ to electronic device power terminal $V_{cc}$ when peripheral device plug 12 engages peripheral socket 28.

As shown in FIG. 4, the switching means may comprise, for example, a switch 64 mounted within housing 14 adjacent peripheral socket 28. The switch 64 may be surface-mounted on a circuit board carrying the peripheral interface hardware in area 16 of card 10. The sensing means comprises an actuator associated with switch 64, such as a lever 66 designed to depress and release a switch button 68, as shown in FIG. 4. The lever 66 is engaged by a portion of the peripheral device plug 12 when peripheral socket 28 engages the plug. The switch 64 may be positioned, for example, such that a portion of plug connector 24 engages lever 66 when peripheral device plug 12 is plugged into peripheral socket 28. Although switch 64 is shown in FIG. 4 as being positioned for engagement with a particular portion of peripheral device plug 12, various alternative arrangements will occur to those skilled in the art in view of this description. Thus, the precise orientation of switch 64 relative to socket 28 and housing 14 may be subject to variation, provided that an actuator associated with the switch is engaged in some manner by a surface or appendage of peripheral device plug 12.

The switch 64 includes an internal switching terminal that, in the first embodiment shown in FIG. 4, is normally open when lever 66 is not engaged by plug connector 24. The switching terminal serves as a junction between first and second leads 70, 72, which are coupled, respectively, to first and second circuit terminals 74, 76 of a circuit 78, represented in the dashed area of FIG. 4. The normally open condition of the switching terminal maintains an open connection between leads 70 and 72 when peripheral device plug 12 does not engage peripheral socket 28. When peripheral device plug 12 is plugged into peripheral socket 28, however, lever 66 is engaged, thereby depressing switch button 68 and closing the switching terminal to connect first and second leads 70 and 72, and thus first and second circuit terminals 74, 76 of circuit 78. The circuit 78 forms part of the switching means, connecting and disconnecting card power terminal $V_{card}$ and electronic device power terminal $V_{cc}$ based on the condition of the internal switching terminal of switch 64.

Figure 5:
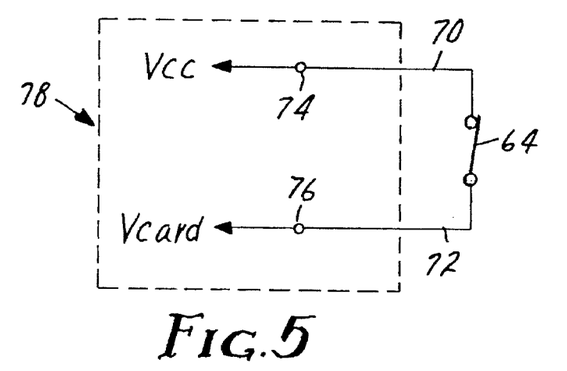
FIG. 5 is a circuit diagram illustrating a first circuit configured for use in the power conservation device of the present invention.

FIG. 5 is a circuit diagram illustrating one example of structure for implementing circuit 78. In FIG. 5, circuit 78 simply comprises a connection of electronic device power terminal $V_{cc}$ and card power terminal $V_{card}$ across first and second circuit terminals 74, 76. When peripheral device plug 12 engages lever 66, the lever depresses switch button 68, causing closure of the switching terminal of switch 64. The closed switching terminal connects first and second leads 70, 72, thereby connecting electronic device power terminal $V_{cc}$ and card power terminal $V_{card}$ via circuit terminals 74, 76. As a result, current flows directly across switch 64 from electronic device power terminal $V_{cc}$ to card power terminal $V_{card}$, powering the peripheral interface hardware of card 10. When peripheral device plug 12 disengages lever 66, however, the lever releases switch button 68, opening the switching terminal of switch 64. As a result, card power terminal $V_{card}$ is rendered incapable of drawing power from electronic device power terminal $V_{cc}$, thereby conserving power.

The dashed area representing circuit 78 serves merely as a representation of the connections made on card 10 between electronic device power terminal $V_{cc}$ and card power terminal $V_{card}$. In practice, switch 64 could be connected between electronic device power terminal $V_{cc}$ and card power terminal $V_{card}$ by simply retrofitting an existing card 10. For example, a conductive trace connecting $V_{cc}$ and $V_{card}$ on the circuit board of area 16 could be broken and replaced with jumper wires connected to first and second circuit terminals 74, 76 of circuit 78. Preferably, card 10 would be redesigned to include conductive traces coupling. $V_{cc}$ and $V_{card}$ across first and second circuit terminals 74, 76. In either case, the internal switching terminal of switch 64 would function to connect $V_{cc}$ and $V_{card}$ when peripheral device plug 12 engages peripheral socket 28, and disconnect $V_{cc}$ and $V_{card}$ when the peripheral device plug disengages the peripheral socket.

FIG. 5 represents a simple and inexpensive implementation of circuit 78. However, because switch 64 directly connects and disconnects power between electronic device power terminal $V_{cc}$ and card power terminal $V_{card}$, additional interface and debounce circuitry may be desired. In addition, current requirements may dictate the use of a switch 64 having a relatively high current capacity, which may increase the physical size of the switch. The increased size of switch 64 may make it more expensive or less suitable for surface mounting or use with PCMCIA form factors. Thus, alternative implementations of circuit 78 may be desirable.

Figure 6:
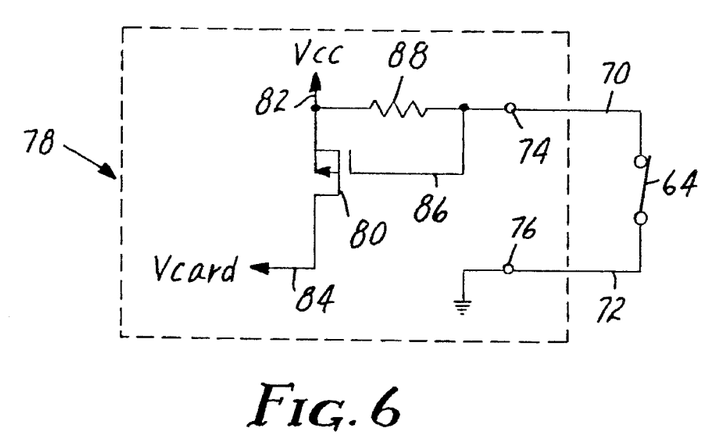
FIG. 6 is a circuit diagram illustrating a second circuit configured for use in the power conservation device of the present invention.

FIG. 6 is an example of an alternative implementation of circuit 78. In FIG. 6, circuit 78 includes a transistor 80 that disconnects and connects electronic device power terminal $V_{cc}$ and card power terminal $V_{card}$ in response to the condition of switch 64. The use of transistor 80 may be advantageous because switch 64 is not required to bear the current flow between $V_{cc}$ and $V_{card}$. The lower current requirements enable switch 64 to be realized by a much smaller switch. The transistor 80 includes a first, source electrode 82 coupled to the electronic device power terminal $V_{cc}$, a second, drain electrode 84 coupled to the card power terminal $V_{card}$, and a control, gate electrode 86 coupled to first circuit terminal 74 and to the electronic device power terminal $V_{cc}$ via a resistor 88. The second circuit terminal 76 is coupled to ground.

When the switching terminal of switch 64 is in its normally open state, as a result of disengagement of lever 66 and peripheral device plug 12, gate electrode 86 is connected to the electronic device power terminal $V_{cc}$ via resistor 88. Consequently, source electrode 82 and gate electrode 86 remain at the same potential, and transistor 80 remains "off," conducting substantially no current from source electrode 82 to drain electrode 84. Thus, when peripheral device plug 12 is not plugged into card 10, transistor 80 effectively disconnects electronic device power terminal $V_{cc}$ and card power terminal $V_{card}$. When the switching terminal of switch 64 is in a closed state, as a result of engagement of lever 66 by peripheral device plug 12, gate electrode is connected to the ground potential via first and second circuit terminals 74, 76. The resultant difference in potential between source electrode 82 and gate electrode 86 biases transistor 80 "on" and allows current to be conducted from electronic device power terminal $V_{cc}$, coupled to source electrode 82, to card power terminal $V_{card}$, coupled to drain electrode 84. Thus, when peripheral device plug 12 is plugged into card 10, indicating use, transistor 80 effectively connects electronic device power terminal $V_{cc}$ and card power terminal $V_{card}$.

Figure 7:
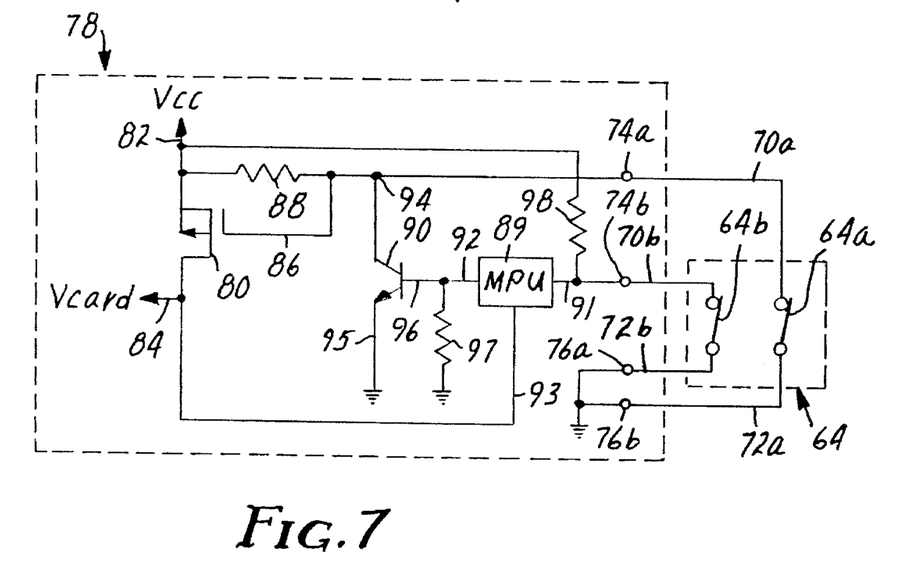
FIG. 7 is a circuit diagram illustrating a third circuit configured for use in the power conservation device of the present invention.

FIG. 7 is another alternative implementation of circuit 78. In FIG. 7, circuit 78 further includes a microprocessor 89 and a second transistor 90. In addition, switch 64 is realized by a single-pull double-throw switch having first and second switching terminals 64a and 64b. The first switching terminal 64a is connected between first and second circuit terminals 74a, 76a via leads 70a, 72a, whereas second switching terminal 64b is connected between first and second circuit terminals 74b, 76b via leads 70b, 72b. The microprocessor 89 has an input 91, an output 92, and a power input 93. The second transistor 90 has a collector electrode 94 coupled to gate electrode 86 of transistor 80, an emitter electrode 95 coupled to the ground potential, and a base electrode 96. The power input 93 of microprocessor 89 is coupled to the card power terminal $V_{card}$, which provides the microprocessor with operating power. The output 92 of microprocessor 89 is coupled to base electrode 96 of second transistor 90 and to the ground potential via a resistor 97. The input 91 of microprocessor 89 is coupled to circuit terminal 74b, thereby receiving indication of the condition of switch 64. The input 91 is also coupled to electronic device power terminal $V_{cc}$ via a resistor 98.

When switching terminals 64a, 64b of switch 64 are simultaneously closed, as a result of engagement of switch lever 66 by peripheral device plug 12, circuit terminal 74a connects the ground potential to gate electrode 86 of transistor 80 via circuit terminal 76a. The resulting difference between the ground potential at gate electrode 86 and the electronic device potential $V_{cc}$ at source electrode 82 serves to turn "on" transistor 80, causing the transistor to conduct current between the source electrode and drain electrode 84. The transistor 80 thereby connects electronic device terminal $V_{cc}$ to card power terminal $V_{card}$ when switch 64 indicates that peripheral device plug 12 engages socket 28, and thus lever 66.

At the same time that circuit terminal 74a connects gate electrode 86 to the ground potential, circuit terminal 74b similarly connects the ground potential to input 91 of microprocessor 89 via circuit terminal 76b. In response to the ground potential sensed at input 91, microprocessor 90 generates a high enable signal at its output 92. The high enable signal is received by base electrode 96 of second transistor 90, which then turns "on" second transistor 90. In the "on" state, the potential at collector electrode 94 of second transistor 90 is driven "low" to approximately the ground potential existing at emitter electrode 95. The low potential at collector electrode 94 is transmitted to gate electrode 86 of transistor 80. Thus, output 92 of microprocessor 89 is effectively coupled, via transistor 90, to transmit an enable signal to gate electrode 86 of transistor 80. When switch 64 is closed, gate electrode 86 sees the ground potential from both circuit terminal 74a and collector electrode 94 of transistor 90, as enabled by microprocessor 89.

When switching terminals 64a, 64b are open, during disengagement of lever 66 and peripheral device plug 12, circuit terminal 74a is disconnected from circuit terminal 76a. As a result, gate electrode 86 of transistor 80 is disconnected from the ground potential. At the same time, circuit terminal 74b is disconnected from circuit terminal 76b, and input 91 of microprocessor 89 is disconnected from the ground potential provided by terminal 74b. Upon disconnection of the ground potential, input 91 is pulled high by resistor 98 to the electronic device potential $V_{cc}$, indicating to microprocessor 89 that switch 64 is open. The disconnection of the ground potential from gate electrode 86 of transistor 80 would turn the transistor "off," thereby disconnecting electronic device power terminal $V_{cc}$ from card power terminal $V_{card}$. Thus, with circuit terminal 74a already disconnected from the ground potential, transistor 80 would be immediately turned "off" if microprocessor 89 generated a low, nonenable signal at output 92 in response to the electronic device potential $V_{cc}$ sensed at input 91, as such a nonenable signal would turn off transistor 90.

The microprocessor 89 does not immediately generate a nonenable signal at output 92, however, but delays for a period of time necessary to perform various shut-down tasks such as memory storage and indexing for later wake-up. After microprocessor 89 has completed necessary shut-down tasks, it generates a low, nonenable signal that turns "off" transistor 90. As a result, collector electrode 94 is no longer driven low, and gate electrode 86 of transistor 80 receives the electronic device potential $V_{cc}$ from source electrode 82 via resistor 88. Thus, output 92 of microprocessor 89 is effectively coupled, via transistor 90, to transmit a nonenable signal to gate electrode 86 of transistor 80. The transistor 80 is consequently turned "off" such that the transistor conducts substantially no current between source electrode 82 and drain electrode 84. Hence, when peripheral device plug 12 is not plugged into card 10, indicating a period of nonuse, microprocessor 89 controls transistor 80 to effectively disconnect electronic device power terminal $V_{cc}$ and card power terminal $V_{card}$. Because card power terminal $V_{card}$ provides operating power to power input 93 of microprocessor 89, the microprocessor is also rendered dead upon disconnection of electronic device power terminal $V_{cc}$ and card power terminal $V_{card}$. When switch 64 is again closed, as a result of engagement of peripheral device plug 12 and lever 66, microprocessor 89 initially remains dead. However, circuit terminal 74a connects gate electrode 86 of transistor 80 to the ground potential via circuit terminal 76a. As a result, transistor 80 turns "on," again connecting electronic device power terminal $V_{cc}$ to card power terminal $V_{card}$. Upon connection of electronic device power terminal $V_{cc}$ and card power terminal $V_{card}$, power input 93 receives operating power, and microprocessor 89 wakes up. The process of delayed shut-down and wake-up is repeated every time peripheral device plug 12 disengages and then later engages socket 28.

The microprocessor 89 can be realized by modifying the control programs executed by a microprocessor already provided on the circuit board mounted in area 16 of peripheral interface card 10. The use of circuit 78 of FIG. 7, including microprocessor 89, may be advantageous because more intelligent control can be achieved without the need for a separate power supply to power the microprocessor. Specifically, the microprocessor can be programmed to carry out the delayed shut-down routine described above with respect to FIG. 7, and also to execute any other routines that may be desired prior to complete deactivation of card 10.

Figure 8:
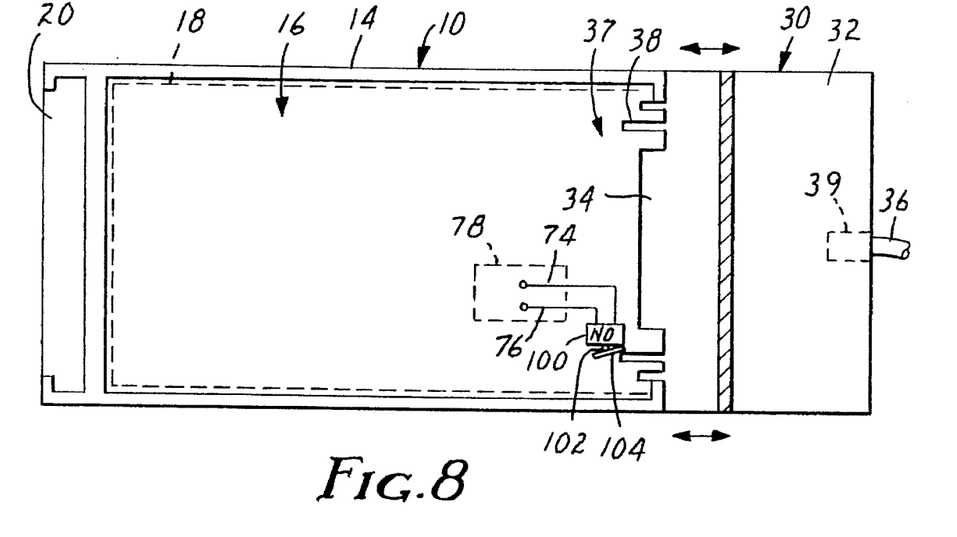
FIG. 8 is a schematic diagram of a peripheral interface card having the second type of peripheral device plug shown in FIG. 2, and incorporating the first embodiment of a power conservation device, in accordance with the present invention.

FIG. 8 is a schematic diagram of a peripheral interface card 10 having the second type of peripheral device plug 30 illustrated in FIG. 2, and incorporating the first embodiment of a power conservation device, in accordance with the present invention. In this first embodiment, as in FIG. 4, the switching means comprises a switch 100 mounted within housing 14 adjacent peripheral socket 37 of card 10. The sensing means comprises a lever 104 designed to depress and release a switch button 102 of switch 100, as shown in FIG. 8. The lever 104 is engaged by a portion of the peripheral device plug 30 when the plug engages peripheral socket 37 of card 10. The switch 64 may be positioned, for example, such that a portion of either plug connector 34 or guide pins 38 engage lever 104 in some manner when peripheral device plug 30 is plugged into peripheral socket 37. Of course, the precise orientation of switch 100 will depend on the manner in which peripheral device plug 30 engages peripheral socket 37 when plugged into card 10.

The switch 100 of FIG. 8 includes an internal switching terminal that is normally open when lever 104 is not engaged by plug 30, as in FIG. 4. The switching terminal serves as a junction between first and second leads 70, 72, which are coupled to first and second circuit terminals 74, 76, respectively. The normally open condition of the switching terminal maintains an open connection between leads 70 and 72 when peripheral device plug 30 does not engage peripheral socket 37. When peripheral device plug 30 is plugged into peripheral socket 37, however, lever 104 is engaged, thereby depressing switch button 102 and closing the switching terminal to connect first and second leads 70, 72, and thus first and second circuit terminals 74, 76. As in FIG. 4, first and second terminals 74 and 76 are part of a circuit 78 represented in FIG. 8 by dashed lines. The circuit 78 again forms part of the switching means, and may embody any of the circuits shown in FIGS. 5–7, such that card power terminal $V_{card}$ and electronic device power terminal $V_{cc}$ are connected and disconnected based on the condition of the internal switching terminal of switch 100.

Figure 9:
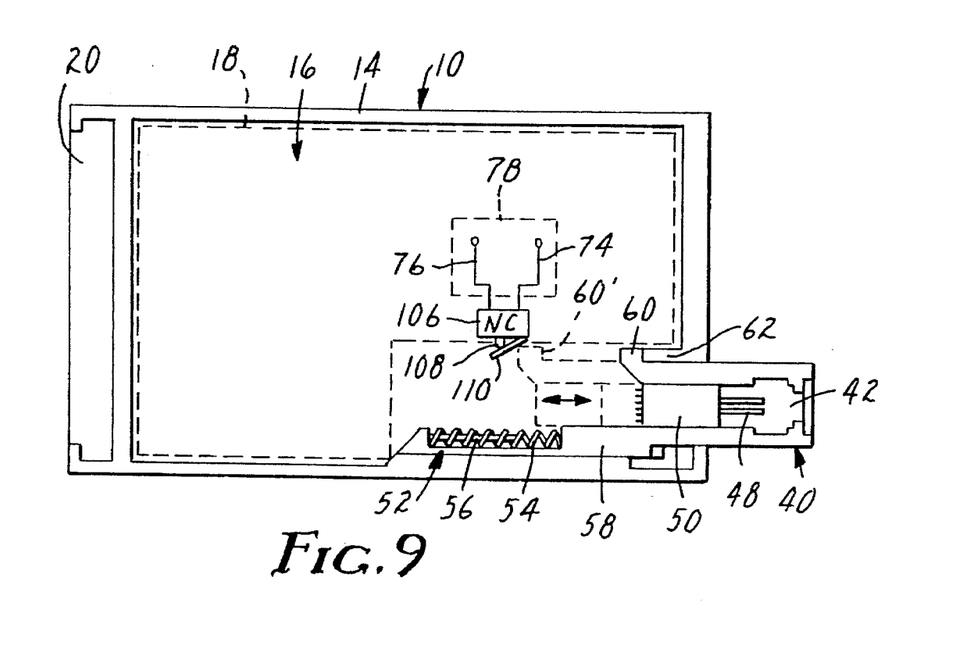
FIG. 9 is a schematic diagram of a peripheral interface card having the extendable/retractable peripheral device socket shown in FIG. 3, and incorporating the first embodiment of a power conservation device, in accordance with the present invention.

FIG. 9 is a schematic diagram of a peripheral interface card 10 having the peripheral device socket 40 illustrated in FIG. 3, and incorporating the first embodiment of a power conservation device, in accordance with the present invention. As in FIGS. 4 and 8, the switching means of FIG. 9 comprises a switch 106 mounted within housing 14. The sensing means comprises a lever 110 associated with switch 106 and designed to depress and release a switch button 108, as shown in FIG. 9. However, lever 110 does not directly sense engagement of socket 40 with a peripheral device plug. Rather, lever 110 is positioned to sense retraction of socket 40 into housing 14 and extension of the socket from the housing, as an indication of use of card 10. By sensing retraction and extension of socket 40, lever 110 senses whether the socket is engaged by a peripheral device plug in the form of an RJ-11 connector plugged into aperture 42. If socket 40 is not extended from housing 14, the socket cannot engage the RJ-11 connector, and therefore cannot connect card 10 to a peripheral device for use. Thus, the extension and retraction of socket 40 gives an indication of use of card 10, providing a basis for connection or disconnection of electronic device power terminal $V_{cc}$ and card power terminal $V_{card}$ by switch 106.

In operation, lever 110 is engaged by the second flange 60 of socket 18 when the socket is retracted into housing 14, as indicated by the dashed outline 60' of the second flange. The lever 110 is disengaged by second flange 60 when the socket is extended from the housing. Although switch 106 is shown in FIG. 2 as being positioned for engagement with second flange 60, various alternative arrangements will occur to those skilled in the art in view of this description. Thus, the precise orientation of switch 106 relative to socket 40 and housing 14 may be subject to variation, provided that an actuator associated with the switch is engaged by a surface or appendage of the socket to sense socket position.

The switch 106 includes an internal switching terminal that, unlike switches 64 and 100 of FIGS. 4 and 8, is normally closed when second flange 60 does not engage lever 110. The normally closed condition enables switch 106 to be connected to any of the circuits 78 shown in FIGS. 5–7. The switching terminal serves as a junction between first lead 70 and second lead 72, which are coupled, respectively, between first circuit terminal 74 and second circuit terminal 76 of circuit 78. The normally closed condition of the switching terminal results in a connection between first and second circuit terminals 74, 76 when lever 110 is disengaged by second flange 60. When second flange 60 engages lever 110, due to retraction of socket 40 within housing 14 during a period of nonuse, the lever depresses switch button 108. The switch button 108 opens the normally closed switching terminal connection, causing the switching terminal to disconnect first and second circuit terminals 74, 76. As in FIGS. 4 and 8, first and second circuit terminals 74 and 76 are part of circuit 78 represented in FIG. 9 by dashed lines. The circuit 78 again forms part of the switching means, and may embody any of the circuits shown in FIGS. 5–7, such that card power terminal $V_{card}$ and electronic device power terminal $V_{cc}$ are connected and disconnected based on the condition of the internal switching terminal of switch 106.

Figure 10:
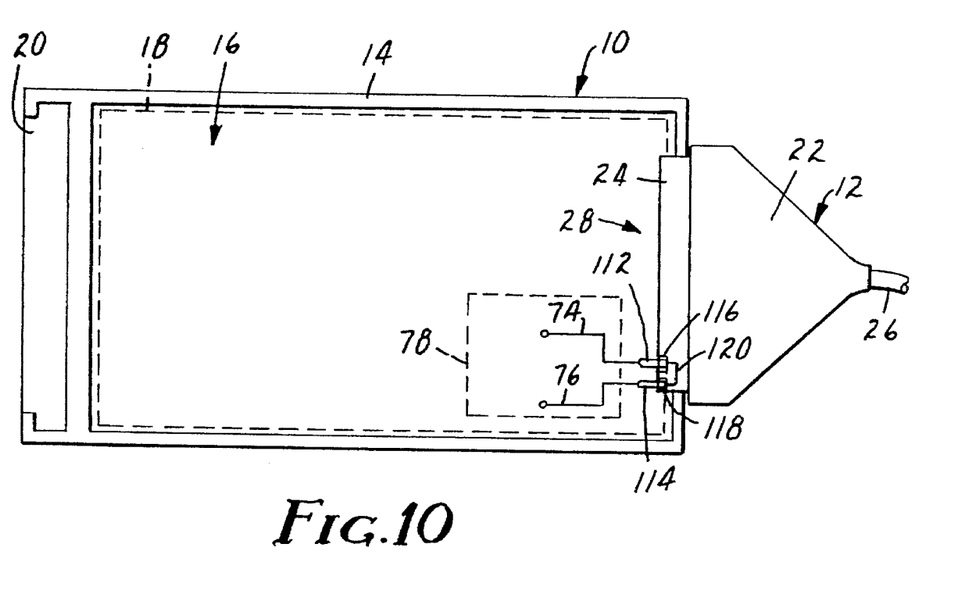
FIG. 10 is a schematic diagram of a peripheral interface card having the first type of peripheral device plug shown in FIG. 1, and incorporating a second embodiment of a power conservation device, in accordance with the present invention.

FIG. 10 is a schematic diagram of a peripheral interface card 10 having the first type of peripheral device socket 12 illustrated in FIG. 1, but incorporating a second embodiment of a power conservation device, in accordance with the present invention. This second embodiment is also readily applicable to a peripheral interface card 10 having the second type of peripheral device socket 30 illustrated in FIG. 2. In FIG. 10, the socket 28 includes a multi-contact connector (not shown) having an electronic device power contact, such as card power pin 112, and a card power contact, such as card power pin 114. The electronic device power pin 112 and card power pin 114 are coupled, respectively, to first and second circuit terminals 74, 76 of circuit 78. In this second embodiment, the sensing means includes an electronic device power mating contact, such as electronic device power socket 116, and a card power mating contact, such as card power socket 118.

The electronic device power socket 116 and card power socket 118 are housed in plug housing 22 of peripheral device plug 12 and mate with electronic device power pin 112 and card power pin 114, respectively, when the peripheral device plug engages peripheral socket 28. Upon engagement of peripheral device plug 12 and peripheral socket 28, the respectively mated sockets 116, 118 and pins 112, 114 are electrically coupled to one another. A coupling link 120, housed in plug housing 22, provides a short-circuit coupling path between electronic device power socket 116 and card power socket 118. The electronic device power socket 116 and card power socket 118 function as the sensing means, sensing engagement of plug 12 and socket 28 by receiving electronic device power pin 112 and card power pin 114, respectively. In this manner, engagement of plug 12 and socket 28 as an indication of use of card 10 is sensed.

The coupling link 120 functions as part of the switching means by connecting first and second circuit terminals 74, 76 of circuit 78 when plug 12 engages socket 28 and disconnecting the first and second terminals when the plug does not engage the socket. In conjunction with circuit 78, which may embody any of the circuits shown in FIGS. 5–7, coupling link 120 connects electronic device power terminal $V_{cc}$ to card power terminal $V_{card}$ via electronic device power pin 112, electronic device power socket 116, card power pin 114, and card power socket 118 when peripheral device plug 12 engages peripheral socket 28. When peripheral device plug 12 does not engage peripheral socket 28, however, coupling link 120 effectively disconnects electronic device power terminal $V_{cc}$ and card power terminal $V_{card}$ in the absence of the respective mating connections between electronic device power pin 112, electronic device power socket 116, card power pin 114, and card power socket 118. The arrangement of electronic device power pin 112, electronic device power socket 116, card power pin 114, card power socket 118, and coupling link 120 thereby allows card power terminal $V_{card}$ to draw power from electronic device terminal $V_{cc}$ only when peripheral device plug 12 is actually plugged into socket 28 for use of card 10, resulting in power conservation.

It is noted that coupling link 120 can be readily configured to have a current capacity sufficient to switch power between $V_{cc}$ and $V_{card}$. Therefore, the simple and inexpensive implementation of circuit 78, as shown in FIG. 5, may be used with this second embodiment. Use of the implementation of circuit 78 comprising transistor 80, as shown in FIG. 6, is nevertheless feasible. Moreover, use of the implementation of circuit 78 comprising microprocessor 89, as shown in FIG. 7, may be particularly desirable as a means to achieve more intelligent control of the connect-disconnect routine, including the ability to perform various shut-down tasks prior to deactivation of peripheral interface card 10.

Figure 11:
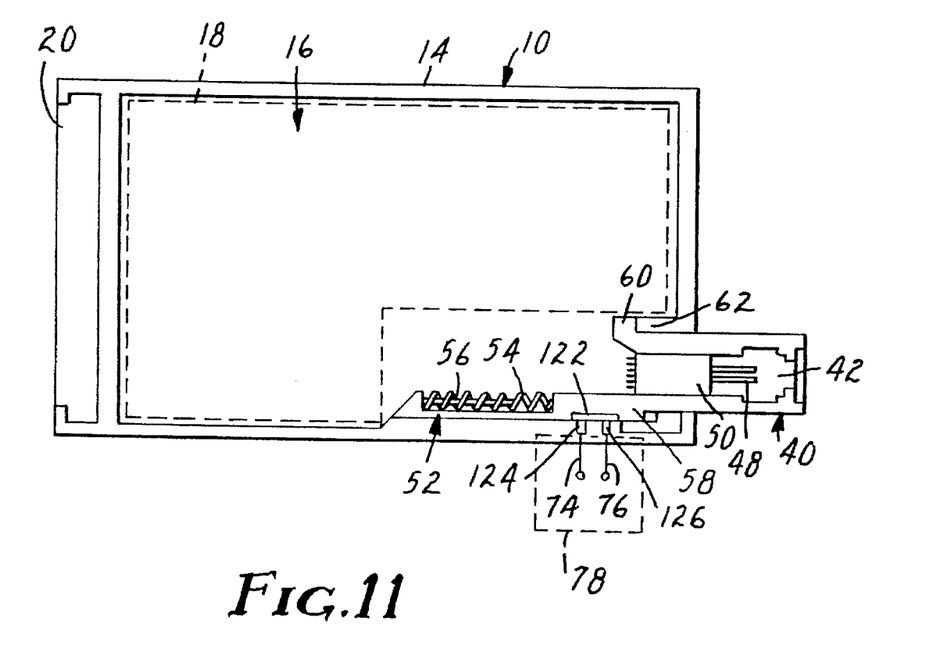
FIG. 11 is a schematic diagram of a peripheral interface card having the extendable/retractable peripheral device socket shown in FIG. 3, and incorporating a third embodiment of a power conservation device, in accordance with the present invention.

FIG. 11 is a schematic diagram of a peripheral interface card 10 having the peripheral device socket 40 illustrated in FIG. 3, and incorporating a third embodiment of a power conservation device, in accordance with the present invention. In this third embodiment, the sensing means includes an electrically conductive contact pad 122 mounted on a lateral portion of socket 40, and the switching means includes an electronic device power contact 124 and a card power contact 126 mounted in housing 14 of card 10, adjacent socket 40. The electronic device power contact 124 and card power contact 126 are electrically coupled, respectively, to electronic device power terminal $V_{cc}$ and card power terminal $V_{card}$ via circuit terminals 74, 76, respectively, of circuit 78. The circuit 78 may again embody any of the circuits shown in FIGS. 5–7. The contact pad 122 is positioned to simultaneously engage electronic device power contact 124 and card power contact 126 only when socket 40 is extended from housing 14 for use. Thus, contact pad 122 effectively senses the simultaneous engagement of the contact pad, electronic device power contact 124, and card power contact 126 as an indication of use of card 10. Upon extension of socket 40 from housing 14, contact pad 122 serves to electrically connect electronic-device power contact 124 and card power contact 126. When socket 40 is retracted into housing 14, contact pad 122 disengages electronic device power contact 124 and card power contact 126, disconnecting them. The contact pad 122 therefore allows card power terminal 126 to draw power from electronic device contact 124 only when socket 40 is extended to receive a peripheral device plug in the form of an RJ-11 connector, resulting in power conservation.

Having described the exemplary embodiments of the invention, additional advantages and modifications will readily occur to those skilled in the art from consideration of the specification and practice of the invention disclosed herein. As an illustration, this description has primarily addressed the conservation of power drawn from a source of primary power $V_{cc}$. If a secondary power source $V_{PP}$ is provided, however, as is the case in many peripheral interface modules, the power conservation device of the present invention may be further applied to prevent unnecessary drain on the secondary power source $V_{PP}$ when card 10 is not in use. For example, the switching means of the present invention could be readily configured as a single-pull, double-throw device, disconnecting both primary power $V_{cc}$ and second power $V_{PP}$ when card 10 is not in use. Therefore, the specification and examples should be considered exemplary only, with the true scope and spirit of the invention being indicated by the following claims.

What is claimed is:

1. A power conservation device for a peripheral interface module configured for use in an electronic device, said module having a housing, peripheral interface hardware mounted within said housing, a socket, mounted within said housing and electrically coupled to said peripheral interface hardware, for being engaged by a peripheral device plug and electrically coupling the peripheral device plug to said peripheral interface hardware, and a module power terminal for receiving power from an electronic device power terminal associated with said electronic device when said module is coupled to said electronic device, and for providing said power to said peripheral interface hardware, said power conservation device comprising:

sensing means for sensing whether said peripheral device plug engages said socket; and switching means, responsive to said sensing means, for disconnecting said module power terminal from said electronic device power terminal when said peripheral device plug does not engage said socket, and connecting said module power terminal to said electronic device power terminal when said peripheral device plug engages said socket.

2. The power conservation device of claim 1, wherein said electronic device is battery-operated, said electronic device power terminal being coupled to a battery and supplying power from said battery.

3. The power conservation device of claim 1, wherein said electronic device is a battery-operated computer and said electronic device power terminal is a computer power terminal, said computer power terminal being coupled to a battery and supplying power from said battery.

4. The power conservation device of claim 1, wherein said peripheral interface module is a peripheral interface card.

5. The power conservation device of claim 1, wherein said switching means comprises a switch-mounted within said housing, and said sensing means comprises an actuator of said switch, said actuator being engaged by a portion of said peripheral device plug when said peripheral device plug engages said socket, and wherein said switch includes a switching terminal for disconnecting said module power terminal from said electronic device power terminal when said portion of said peripheral device plug does not engage said actuator, and connecting said module power terminal to said electronic device power terminal when said portion of said peripheral device plug engages said actuator.

6. The power conservation device of claim 1, wherein said switching means comprises a switch mounted within said housing, said sensing means comprises an actuator of said switch, said actuator being engaged by a portion of said peripheral device plug when said peripheral device plug engages said socket, said switch including a switching terminal that is closed by said actuator when said portion of said peripheral device plug engages said actuator, and opened by said actuator when said portion of said peripheral device plug does not engage said actuator, and wherein said switching means further comprises:

a transistor having a first electrode coupled to said electronic device power terminal, a second electrode coupled to said module power terminal, and a control electrode coupled to said switching terminal of said switch, said transistor conducting substantially no current from said first electrode to said second electrode when said switching terminal is open, thereby disconnecting said module power terminal from said electronic device power terminal, and said transistor conducting current from said first electrode to said second electrode when said switching terminal is closed, thereby connecting said module power terminal to said electronic device power terminal.

7. The power conservation device of claim 1, wherein said switching means comprises a switch mounted within said housing, said sensing means comprises an actuator of said switch, said actuator being engaged by a portion of said peripheral device plug when said peripheral device plug engages said socket, said switch including a switching terminal that is closed by said actuator when said portion of said peripheral device plug engages said actuator, and opened by said actuator when said portion of said peripheral device plug does not engage said actuator, and wherein said switching means further comprises:

a transistor having a first electrode coupled to said electronic device power terminal, a second electrode coupled to said module power terminal, and a control electrode, said transistor conducting current from said first electrode to said second electrode in response to an enable signal received by said control electrode, thereby connecting said module power terminal to said electronic device power terminal, and said transistor conducting substantially no current from said first electrode to said second electrode in response to a nonenable signal received by said control electrode, thereby disconnecting said module power terminal from said electronic device power terminal; and     a microprocessor having an input coupled to said switching terminal of said switch and an output coupled to transmit said enable signal and said nonenable signal to said control electrode of said transistor, said microprocessor generating said enable signal at said output when said switching terminal is closed, thereby biasing said transistor to connect said module power terminal to said electronic device power terminal, and said microprocessor generating said nonenable signal at said output when said switching terminal is open, thereby biasing said transistor to disconnect said module power terminal from said electronic device power terminal.

8. The power conservation device of claim 1, wherein said socket is extendable from said housing to receive said peripheral device plug and retractable into said housing when said module is not in use, said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said sensing means thereby sensing the retraction and the extension of said socket as an indication of whether said peripheral device plug engages said socket, and wherein said switch includes a switching terminal for disconnecting said module power terminal from said electronic device power terminal when said portion of said socket engages said actuator, and connecting said module power terminal to said electronic device power terminal when said portion of said socket does not engage said actuator.

9. The power conservation device of claim 1, wherein said socket is extendable from said housing to receive said peripheral device plug and retractable into said housing when said module is not in use, said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said sensing means thereby sensing the retraction and the extension of said socket as an indication of whether said peripheral device plug engages said socket, said switch including a switching terminal that is opened by said actuator when said portion of said socket engages said actuator, and closed by said actuator when said portion of said socket does not engage said actuator, and wherein said switching means further comprises:

a transistor having a first electrode coupled to said electronic device power terminal, a second electrode coupled to said module power terminal, and a control electrode coupled to said switching terminal of said switch, said transistor conducting substantially no current from said first electrode to said second electrode when said switching terminal is open, thereby disconnecting said module power terminal from said electronic device power terminal, and said transistor conducting current from said first electrode to said second electrode when said switching terminal is closed, thereby connecting said module power terminal to said electronic device power terminal.

10. The power conservation device of claim 1, wherein said socket is extendable from said housing to receive said peripheral device plug and retractable into said housing when said module is not in use, said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said sensing means thereby sensing the retraction and the extension of said socket as an indication of whether said peripheral device plug engages said socket, said switch including a switching terminal that is opened by said actuator when said portion of said socket engages said actuator, and closed by said actuator when said portion of said socket does not engage said actuator, and wherein said switching means further comprises:

a transistor having a first electrode coupled to said electronic device power terminal, a second electrode coupled to said module power terminal, and a control electrode, said transistor conducting current from said first electrode to said second electrode in response to an enable signal received by said control electrode, thereby connecting said module power terminal to said electronic device power terminal, and said transistor conducting substantially no current from said first electrode to said second electrode in response to a nonenable signal received by said control electrode, thereby disconnecting said module power terminal from said electronic device power terminal; and a microprocessor having an input coupled to said switching terminal of said switch and an output coupled to transmit said enable signal and said nonenable signal to said control electrode of said transistor, said microprocessor generating said enable signal at said output when said switching terminal is closed, thereby biasing said transistor to connect said module power terminal to said electronic device power terminal, and said microprocessor generating said nonenable signal at said output when said switching terminal is open, thereby biasing said transistor to disconnect said module power terminal from said electronic device power terminal.

11. The power conservation device of claim 1, wherein said socket is extendable from said housing to receive said peripheral device plug and retractable into said housing when said module is not in use, said switching means includes a module power contact coupled to said module power terminal and an electronic device power contact coupled to said electronic device power terminal, said module power contact and said electronic device power contact being mounted on said housing, and said sensing means includes a contact pad mounted on said socket and positioned to simultaneously engage said module power contact and said electronic device power contact only when said socket is extended from said housing, said contact pad sensing the simultaneous engagement of said contact pad, said module power contact, and said electronic device power contact, said sensing means thereby sensing the extension of said socket as an indication of whether said peripheral device plug engages said socket, said contact pad connecting said module power terminal to said electronic device power terminal via said module power contact and said electronic device power contact when said contact pad simultaneously engages said module power contact and said electronic device power contact, and disconnecting said module power terminal from said electronic device power terminal via said module power contact and said electronic device power contact when said contact pad does not simultaneously engage said module power contact and said electronic device power contact.

12. The power conservation device of claim 1, wherein said socket includes a module power contact coupled to said module power terminal and an electronic device power contact coupled to said electronic device power terminal, said sensing means includes a module power mating contact housed in said peripheral device plug and an electronic device power mating contact housed in said peripheral device plug, said module power mating contact being coupled to said module power contact of said socket when said peripheral device plug engages said socket, and said electronic device power mating contact being coupled to said electronic device power contact of said socket when said peripheral device plug engages said socket, said sensing means sensing coupling of said module power mating contact and said module power contact and coupling of said electronic device power mating contact and said electronic device power contact, and said switching means comprises a coupling link coupled said module power mating contact and said electronic device power mating contact, said coupling link connecting said module power terminal to said electronic device power terminal via said module power contact, said module power mating contact, said electronic device power mating contact, and said electronic device power contact when said peripheral device plug engages said socket, and disconnecting said module power terminal from said electronic device power terminal via said module power contact, said module power mating contact, said electronic device power mating contact, and said electronic device power contact when said peripheral device plug does not engage said socket.

13. A peripheral interface module configured for use in an electronic device, said module comprising:

a housing;

peripheral interface hardware mounted within said housing;

a socket, mounted within said housing and electrically coupled to said peripheral interface hardware, for being engaged by a peripheral device plug and electrically coupling the peripheral device plug to said peripheral interface hardware;

a module power terminal for receiving power from an electronic device power terminal associated with said electronic device when said module is coupled to said electronic device, and for providing said power to said peripheral interface hardware;

sensing means for sensing whether said peripheral device plug engages said socket; and switching means, responsive to said sensing means, for disconnecting said module power terminal from said electronic device power terminal when said peripheral device plug does not engage said socket, and connecting said module power terminal to said electronic device power terminal when said peripheral device plug engages said socket.

14. The peripheral interface module of claim 13, wherein said electronic device is battery-operated, said electronic device power terminal being coupled to a battery and supplying power from said battery.

15. The peripheral interface module of claim 13, wherein said electronic device is a battery-operated computer and said electronic device power terminal is a computer power terminal, said computer power terminal being coupled to a battery and supplying power from said battery.

16. The peripheral interface module of claim 13, wherein said peripheral interface module is a peripheral interface card.

17. The peripheral interface module of claim 13, wherein said switching means comprises a switch mounted within said housing, and said sensing means comprises an actuator of said switch, said actuator being engaged by a portion of said peripheral device plug when said peripheral device plug engages said socket, and wherein said switch includes a switching terminal for disconnecting said module power terminal from said electronic device power terminal when said portion of said peripheral device plug does not engage said actuator, and connecting said module power terminal to said electronic device power terminal when said portion of said peripheral device plug engages said actuator.

18. The peripheral interface module of claim 13, wherein said switching means comprises a switch mounted within said housing, said sensing means comprises an actuator of said switch, said actuator being engaged by a portion of said peripheral device plug when said peripheral device plug engages said socket, said switch including a switching terminal that is closed by said actuator when said portion of said peripheral device plug engages said actuator, and opened by said actuator when said portion of said peripheral device plug does not engage said actuator, and wherein said switching means further comprises:

a transistor having a first electrode coupled to said electronic device power terminal, a second electrode coupled to said module power terminal, and a control electrode coupled to said switching terminal of said switch, said transistor conducting substantially no current from said first electrode to said second electrode when said switching terminal is open, thereby disconnecting said module power terminal from said electronic device power terminal, and said transistor conducting current from said first electrode to said second electrode when said switching terminal is closed, thereby connecting said module power terminal to said electronic device power terminal.

19. The peripheral interface module of claim 13, wherein said switching means comprises a switch mounted within said housing, said sensing means comprises an actuator of said switch, said actuator being engaged by a portion of said peripheral device plug when said peripheral device plug engages said socket, said switch including a switching terminal that is closed by said actuator when said portion of said peripheral device plug engages said actuator, and opened by said actuator when said portion of said peripheral device plug does not engage said actuator, and wherein said switching means further comprises:

a transistor having a first electrode coupled to said electronic device power terminal, a second electrode coupled to said module power terminal, and a control electrode, said transistor conducting current from said first electrode to said second electrode in response to an enable signal received by said control electrode, thereby connecting said module power terminal to said electronic device power terminal, and said transistor conducting substantially no current from said first electrode to said second electrode in response to a nonenable signal received by said control electrode, thereby disconnecting said module power terminal from said electronic device power terminal; and a microprocessor having an input coupled to said switching terminal of said switch and an output coupled to transmit said enable signal and said nonenable signal to said control electrode of said transistor, said microprocessor generating said enable signal at said output when said switching terminal is closed, thereby biasing said transistor to connect said module power terminal to said electronic device power terminal, and said microprocessor generating said nonenable signal at said output when said switching terminal is open, thereby biasing said transistor to disconnect said module power terminal from said electronic device power terminal.

20. The peripheral interface module of claim 13, wherein said socket is extendable from said housing to receive said peripheral device plug and retractable into said housing when said module is not in use, said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said sensing means thereby sensing the retraction and the extension of said socket as an indication of whether said peripheral device plug engages said socket, and wherein said switch includes a switching terminal for disconnecting said module power terminal from said electronic device power terminal when said portion of said socket engages said actuator, and connecting said module power terminal to said electronic device power terminal when said portion of said socket does not engage said actuator.

21. The peripheral interface module of claim 13, wherein said socket is extendable from said housing to receive said peripheral device plug and retractable into said housing when said module is not in use, said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said sensing means thereby sensing the retraction and the extension of said socket as an indication of whether said peripheral device plug engages said socket, said switch including a switching terminal that is opened by said actuator when said portion of said socket engages said actuator, and closed by said actuator when said portion of said socket does not engage said actuator, and wherein said switching means further comprises:

a transistor having a first electrode coupled to said electronic device power terminal, a second electrode coupled to said module power terminal, and a control electrode coupled to said switching terminal of said switch, said transistor conducting substantially no current from said first electrode to said second electrode when said switching terminal is open, thereby disconnecting said module power terminal from said electronic device power terminal, and said transistor conducting current from said first electrode to said second electrode when said switching terminal is closed, thereby connecting said module power terminal to said electronic device power terminal.

22. The peripheral interface module of claim 13, wherein said socket is extendable from said housing to receive said peripheral device plug and retractable into said housing when said module is not in use, said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said sensing means thereby sensing the retraction and the extension of said socket as an indication of whether said peripheral device plug engages said socket, said switch including a switching terminal that is opened by said actuator when said portion of said socket engages said actuator, and closed by said actuator when said portion of said socket does not engage said actuator, and wherein said switching means further comprises:

a transistor having a first electrode coupled to said electronic device power terminal, a second electrode coupled to said module power terminal, and a control electrode, said transistor conducting current from said first electrode to said second electrode in response to an enable signal received by said control electrode, thereby connecting said module power terminal to said electronic device power terminal, and said transistor conducting substantially no current from said first electrode to said second electrode in response to a nonenable signal received by said control electrode, thereby disconnecting said module power terminal from said electronic device power terminal; and a microprocessor having an input coupled to said switching terminal of said switch and an output coupled to transmit said enable signal and said nonenable signal to said control electrode of said transistor, said microprocessor generating said enable signal at said output when said switching terminal is closed, thereby biasing said transistor to connect said module power terminal to said electronic device power terminal, and said microprocessor generating said nonenable signal at said output when said switching terminal is open, thereby biasing said transistor to disconnect said module power terminal from said electronic device power terminal.

23. The peripheral interface module of claim 13, wherein said socket is extendable from said housing to receive said peripheral device plug and retractable into said housing when said module is not in use, said switching means includes a module power contact coupled to said module power terminal and an electronic device power contact coupled to said electronic device power terminal, said module power contact and said electronic device power contact being mounted on said housing, and said sensing means includes a contact pad mounted on said socket and positioned to simultaneously engage said module power contact and said electronic device power contact only when said socket is extended from said housing, said contact pad sensing the simultaneous engagement of said contact pad, said module power contact, and said electronic device power contact, said sensing means thereby sensing the extension of said socket as an indication of whether said peripheral device plug engages said socket, said contact pad connecting said module power terminal to said electronic device power terminal via said module power contact and said electronic device power contact when said contact pad simultaneously engages said module power contact and said electronic device power contact, and disconnecting said module power terminal from said electronic device power terminal via said module power contact and said electronic device power contact when said contact pad does not simultaneously engage said module power contact and said electronic device power contact.

24. The peripheral interface module of claim 13, wherein said socket includes a module power contact coupled to said module power terminal and an electronic device power contact coupled to said electronic device power terminal, said sensing means includes a module power mating contact housed in said peripheral device plug and an electronic device power mating contact housed in said peripheral device plug, said module power mating contact being coupled to said module power contact of said socket when said peripheral device plug engages said socket, and said electronic device power mating contact being coupled to said electronic device power contact of said socket when said peripheral device plug engages said socket, said sensing means sensing coupling of said module power mating contact and said module power contact and coupling of said electronic device power mating contact and said electronic device power contact, and said switching means comprises a coupling link coupled said module power mating contact and said electronic device power mating contact, said coupling link connecting said module power terminal to said electronic device power terminal via said module power contact, said module power mating contact, said electronic device power mating contact, and said electronic device power contact when said peripheral device plug engages said socket, and disconnecting said module power terminal from said electronic device power terminal via said module power contact, said module power mating contact, said electronic device power mating contact, and said electronic device power contact when said peripheral device plug does not engage said socket.

25. A power conservation device for a peripheral interface module configured for use in an electronic device, said module having a housing, peripheral interface hardware mounted within said housing, a socket, mounted within said housing and electrically coupled to said peripheral interface hardware, for being engaged by a peripheral device plug and electrically coupling the peripheral device plug to said peripheral interface hardware, wherein said socket is extendable from said housing to receive said peripheral device plug and retractable into said housing when said module is not in use, and a module power terminal for receiving power from an electronic device power terminal associated with said electronic device when said module is coupled to said electronic device, and for providing said power to said peripheral interface hardware, said power conservation device comprising:

sensing means for sensing whether said socket is extended from said housing or retracted into said housing; and switching means, responsive to said sensing means, for disconnecting said module power terminal from said electronic device power terminal when said socket is retracted into said housing, and connecting said module power terminal to said electronic device power terminal when said socket is extended from said housing.

26. The power conservation device of claim 25, wherein said electronic device is battery-operated, said electronic device power terminal being coupled to a battery and supplying power from said battery.

27. The power conservation device of claim 25, wherein said electronic device is a battery-operated computer and said electronic device power terminal is a computer power terminal, said computer power terminal being coupled to a battery and supplying power from said battery.

28. The power conservation device of claim 25, wherein said peripheral interface module is a peripheral interface card.

29. The power conservation device of claim 25, wherein said switching means comprises a switch mounted within said housing, and said sensing means comprises an actuator of said switch, said actuator being engaged by a portion of said socket when said socket is retracted into said housing and disengaged by said portion of said socket when said socket is extended from said housing, and wherein said switch includes a switching terminal for disconnecting said module power terminal from said electronic device power terminal when said portion of said socket engages said actuator, and connecting said module power terminal to said electronic device power terminal when said portion of said socket does not engage said actuator.

30. The power conservation device of claim 25, wherein said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said switch including a switching terminal that is opened by said actuator when said portion of said socket engages said actuator, and closed by said actuator when said portion of said socket does not engage said actuator, and wherein said switching means further comprises:

a transistor having a first electrode coupled to said electronic device power terminal, a second electrode coupled to said module power terminal, and a control electrode coupled to said switching terminal of said switch, said transistor conducting substantially no current from said first electrode to said second electrode when said switching terminal is open, thereby disconnecting said module power terminal from said electronic device power terminal, and said transistor conducting current from said first electrode to said second electrode when said switching terminal is closed, thereby connecting said module power terminal to said electronic device power terminal.

31. The power conservation device of claim 25, wherein said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said switch including a switching terminal that is opened by said actuator when said portion of said socket engages said actuator, and closed by said actuator when said portion of said socket does not engage said actuator, and wherein said switching means further comprises:

- a transistor having a first electrode coupled to said electronic device power terminal, a second electrode coupled to said module power terminal, and a control electrode, said transistor conducting current from said first electrode to said second electrode in response to an enable signal received by said control electrode, thereby connecting said module power terminal to said electronic device power terminal, and said transistor conducting substantially no current from said first electrode to said second electrode in response to a nonenable signal received by said control electrode, thereby disconnecting said module power terminal from said electronic device power terminal; and
- a microprocessor having an input coupled to said switching terminal of said switch and an output coupled to transmit said enable signal and said nonenable signal to said control electrode of said transistor, said microprocessor generating said enable signal at said output when said switching terminal is closed, thereby biasing said transistor to connect said module power terminal to said electronic device power terminal, and said microprocessor generating said nonenable signal at said output when said switching terminal is open, thereby biasing said transistor to disconnect said module power terminal from said electronic device power terminal.

32. The power conservation device of claim 25, wherein said switching means includes a module power contact coupled to said module power terminal and an electronic device power contact coupled to said electronic device power terminal, said module power contact and said electronic device power contact being mounted on said housing, and said sensing means includes a contact pad mounted on said socket and positioned to simultaneously engage said module power contact and said electronic device power contact only when said socket is extended from said housing, said contact pad sensing the simultaneous engagement of said contact pad, said module power contact, and said electronic device power contact, said contact pad connecting said module power terminal to said electronic device power terminal via said module power contact and said electronic device power contact when said contact pad simultaneously engages said module power contact and said electronic device power contact, and disconnecting said module power terminal from said electronic device power terminal via said module power contact and said electronic device power contact when said contact pad does not simultaneously engage said module power contact and said electronic device power contact.

33. A peripheral interface module configured for use in an electronic device, said peripheral interface module comprising:

- a housing;
- peripheral interface hardware mounted within said housing;
- a socket, mounted within said housing and electrically coupled to said peripheral interface hardware, for being engaged by a peripheral device plug and electrically coupling the peripheral device plug to said peripheral interface hardware, wherein said socket is extendable from said housing to receive said peripheral device plug and retractable into said housing when said module is not in use;
- a module power terminal for receiving power from an electronic device power terminal associated with said electronic device when said module is coupled to said electronic device, and for providing said power to said peripheral interface hardware;
- sensing means for sensing whether said socket is extended from said housing or retracted into said housing; and
- switching means, responsive to said sensing means, for disconnecting said module power terminal from said electronic device power terminal when said socket is retracted into said housing, and connecting said module power terminal to said electronic device power terminal when said socket is extended from said housing.

34. The peripheral interface module of claim 33, wherein said electronic device is battery-operated, said electronic device power terminal being coupled to a battery and supplying power from said battery.

35. The peripheral interface module of claim 33, wherein said electronic device is a battery-operated computer and said electronic device power terminal is a computer power terminal, said computer power terminal being coupled to a battery and supplying power from said battery.

36. The peripheral interface module of claim 33, wherein said peripheral interface module is a peripheral interface card.

37. The peripheral interface module of claim 33, wherein said switching means comprises a switch mounted within said housing, and said sensing means comprises an actuator of said switch, said actuator being engaged by a portion of said socket when said socket is retracted into said housing and disengaged by said portion of said socket when said socket is extended from said housing, and wherein said switch includes a switching terminal for disconnecting said module power terminal from said electronic device power terminal when said portion of said socket engages said actuator, and connecting said module power terminal to said electronic device power terminal when said portion of said socket does not engage said actuator.

38. The peripheral interface module of claim 33, wherein said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said switch including a switching terminal that is opened by said actuator when said portion of said socket engages said actuator, and closed by said actuator when said portion of said socket does not engage said actuator, and wherein said switching means further comprises:

- a transistor having a first electrode coupled to said electronic device power terminal, a second electrode coupled to said module power terminal, and a control electrode coupled to said switching terminal of said switch, said transistor conducting substantially no current from said first electrode to said second electrode when said switching terminal is open, thereby disconnecting said module power terminal from said electronic device power terminal, and said transistor conducting current from said first electrode to said second electrode when said switching terminal is closed, thereby connecting said module power terminal to said electronic device power terminal.

39. The peripheral interface module of claim 33, wherein said switching means comprises a switch mounted within said housing, and said sensing means comprises an actuator of said switch, said actuator being engaged by a portion of said socket when said socket is retracted into said housing and disengaged by said portion of said socket when said socket is extended from said housing, said switch including a switching terminal that is opened by said actuator when said portion of said socket engages said actuator, and closed by said actuator when said portion of said socket does not engage said actuator, and wherein said switching means further comprises:

- a transistor having a first electrode coupled to said electronic device power terminal, a second electrode coupled to said module power terminal, and a control electrode, said transistor conducting current from said first electrode to said second electrode in response to an enable signal received by said control electrode, thereby connecting said module power terminal to said electronic device power terminal, and said transistor conducting substantially no current from said first electrode to said second electrode in response to a nonenable signal received by said control electrode, thereby disconnecting said module power terminal from said electronic device power terminal; and
- a microprocessor having an input coupled to said switching terminal of said switch and an output coupled to transmit said enable signal and said nonenable signal to said control electrode of said transistor, said microprocessor generating said enable signal at said output when said switching terminal is closed, thereby biasing said transistor to connect said module power terminal to said electronic device power terminal, and said microprocessor generating said nonenable signal at said output when said switching terminal is open, thereby biasing said transistor to disconnect said module power terminal from said electronic device power terminal.

40. The peripheral interface module of claim 33, wherein said switching means includes a module power contact coupled to said module power terminal and an electronic device power contact coupled to said electronic device power terminal, said module power contact and said electronic device power contact being mounted on said housing, and said sensing means includes a contact pad mounted on said socket and positioned to simultaneously engage said module power contact and said electronic device power contact only when said socket is extended from said housing, said contact pad sensing the simultaneous engagement of said contact pad, said module power contact, and said electronic device power contact, said contact pad connecting said module power terminal to said electronic device power terminal via said module power contact and said electronic device power contact when said contact pad simultaneously engages said module power contact and said electronic device .power contact, and disconnecting said module power terminal from said electronic device power terminal via said module power contact and said electronic device power contact when said contact pad does not simultaneously engage said module power contact and said electronic device power contact.

* * * * *

UNITED STATES PATENT AND TRADEMARK OFFICE
CERTIFICATE OF CORRECTION

PATENT NO. : 5,463,261
DATED : October 31, 1995
INVENTOR(S) : Skarda et al.

It is certified that error appears in the above-indentified patent and that said Letters Patent is hereby corrected as shown below:

Column 1, line 34, delete "ALAN" and insert --A LAN--.
Column 5, line 50, delete "carded" and insert --carried--.
Column 5, line 53, delete "carded" and insert --carried--.

Signed and Sealed this

Thirtieth Day of April, 1996

Attest:

BRUCE LEHMAN

Attesting Officer     Commissioner of Patents and Trademarks